United States Patent [19]

Andersen

[11] Patent Number: 4,891,716

[45] Date of Patent: Jan. 2, 1990

[54] AUTOCALIBRATION OF A DATA SIGNAL CHANNEL THROUGH SIMULTANEOUS CONTROL SIGNALS

[75] Inventor: Robert D. Andersen, West Covina, Calif.

[73] Assignee: Datatape Incorporated, Pasadena, Calif.

[21] Appl. No.: 252,843

[22] Filed: Oct. 3, 1988

[51] Int. Cl.$^4$ .................. G11B 27/36; G11B 15/14
[52] U.S. Cl. .......................................... 360/31; 360/65
[58] Field of Search .......................... 360/31, 65, 67; 381/103

[56] References Cited

U.S. PATENT DOCUMENTS

| | | |
|---|---|---|
| 3,541,458 | 11/1970 | Klund . |
| 3,694,637 | 9/1972 | Edwin et al. . |
| 3,732,370 | 5/1973 | Sacks .................................. 381/103 |
| 3,747,095 | 7/1973 | Wilson . |
| 3,846,752 | 11/1974 | Nakano et al. . |
| 4,169,245 | 9/1979 | Crom et al. . |
| 4,279,005 | 7/1981 | Kitamura et al. ................. 360/31 |
| 4,319,334 | 3/1982 | Gurry . |
| 4,390,949 | 6/1983 | Beningfield et al. . |
| 4,480,274 | 10/1984 | Coleman, Jr. ..................... 360/31 |
| 4,531,165 | 7/1985 | Sonu et al. ........................ 360/65 |
| 4,559,569 | 12/1985 | Otsuki et al. ..................... 360/65 |
| 4,607,216 | 8/1986 | Yamaguchi et al. . |
| 4,612,533 | 9/1986 | Evans . |
| 4,764,915 | 8/1988 | Efron et al. ....................... 360/31 |

Primary Examiner—Vincent P. Canney
Attorney, Agent, or Firm—William F. Noval

[57] ABSTRACT

A data signal channel, such as a record/reproduce channel of a magnetic tape recorder, is automatically calibrated by means of multiple control signals which are applied to the channel simultaneously. The disclosed technique is fast, accurate, and effective in automatically calibrating a multispeed, multichannel, magnetic tape recorder in an optimum amount of time. A channel to be calibrated is stimulated with a complex wave-form having harmonic content at frequencies where reproduce amplifier equalization controls are effective. The channel response is measured and analyzed into the desired frequency components. A set of error values are determined by calculating the difference between the measured response values and known target response values at the desired frequencies. If the set of error values are not within allowable error limits, new control values are calculated from multiple control equations. The new control values are generated and sent to adjust the equalization controls. The process is reiterated until the calculated errors are within allowable limits for each of the desired frequency components.

4 Claims, 5 Drawing Sheets

FIG. 1

TABLE I $C_f = \boxed{M_{(f)f}} + M_{(f)3} + M_{(f)5} + M_{(f)7} + M_{(f)9} + M_{(f)11}$ $C_3 = M_{(3)f} + \boxed{M_{(3)3}} + M_{(3)5} + M_{(3)7} + M_{(3)9} + M_{(3)11}$ $C_5 = M_{(5)f} + M_{(5)3} + \boxed{M_{(5)5}} + M_{(5)7} + M_{(5)9} + M_{(5)11}$ $C_7 = M_{(7)f} + M_{(5)3} + M_{(7)5} + \boxed{M_{(7)7}} + M_{(7)9} + M_{(7)11}$ $C_9 = M_{(9)f} + M_{(5)3} + M_{(9)5} + M_{(9)7} + \boxed{M_{(7)9}} + M_{(9)11}$ $C_{11} = M_{(11)f} + M_{(5)3} + M_{(11)5} + M_{(11)7} + M_{(9)9} + \boxed{M_{(11)11}}$

AUTOCALIBRATION OF A DATA SIGNAL CHANNEL THROUGH SIMULTANEOUS CONTROL SIGNALS

BACKGROUND OF THE INVENTION

This invention relates in general to the calibration of data signal channels. More particularly, this invention relates to the automatic calibration of the record/reproduce channel of a magnetic tape recorder. Several circuit components of a reproduce amplifier/equalization circuit of the channel are adjusted simultaneously to effect rapid calibration of the channel.

Signals which are transmitted over a data signal channel, such as the record/reproduce channel of a magnetic tape recorder, are subject to nonlinear frequency response and nonlinear phase response, with the result that such signals are distorted and attenuated. For example, a record/reproduce channel of a magnetic tape recorder includes a reproduce magnetic head, the frequency and phase response of which is affected by many factors. These factors include the length of the reproduce head gap, tape-to-head aerodynamics, tape surface finish and frequency losses in the head's magnetic materials. Thus, it has been the practice to use an amplitude and phase equalization reproduce circuit, to compensate for nonlinear frequency and phase distortion in order to provide a uniform response over the frequency band of interest.

With even the most sophisticated manufacturing processes and controls, head-to-head variations are such, as to require, equalization circuits having adjustable components to optimize the performance of each record/reproduce channel. Thus, as a magnetic head is used, tape running over the head causes wear which changes some of the dimensions effecting magnetic losses and tape-to-head aerodynamics. This in turn changes the head response necessitating periodic adjustments to the equalization circuit. Where these adjustments are performed manually, the adjustment procedure requires several iterations, is time consuming, and requires considerable skill and experience on the part of an operator. These problems are compounded in the case of multispeed playback systems, since the equalization function has to be changed and readjusted for each playback speed. Where the magnetic tape recorder has several channels, manual calibration of each record/reproduce channel for each magnetic tape speed is time-consuming and inefficient.

It has been proposed to effect automatic calibration of the record/reproduce channels of a magnetic tape recorder by using as a calibration signal a psuedorandom digital pattern which contains frequency components necessary for adjusting the reproduce equalizer circuit. In the proposed technique, repetitive adjustments are made at each frequency of interest. Once the calibration signal is within the amplitude error limits at one frequency, a second set of iterative adjustments are made at the next frequency. Since the reproduce equalizer adjustments are interactive, i.e. one adjustment can effect other adjustments, after the amplitude of the second frequency signal is brought within error limits, the routine must branch back to repeat adjustments for the first frequency amplitude. Thereafter, adjustments are made for a third frequency of interest and for phase. In each case the routine must branch back and repeat iterative adjustments for earlier frequency amplitudes brought within error limits. This technique is disadvantageous because of the time required in performing the sequential and multiple iterative adjustments for each channel at each speed.

SUMMARY OF THE INVENTION

According to the present invention, there is provided a technique for obviating the disadvantages of data channel calibration techniques of the prior art. The technique of the present invention effects calibration of a multichannel multispeed magnetic tape recorder, accurately, automatically and in an optimal time.

According to an aspect of the present invention, a record/reproduce channel of a magnetic tape recorder is stimulated with a calibration signal having a complex waveform with harmonic content at frequencies where equalization controls are effective. The channel response to the stimulation is measured and analyzed at the desired frequencies. A set of error values are determined by calculating the difference between expected values and measured values. If the set of error values are outside of predetermined allowable error limits, new control values for each of the adjustable components of the equalization circuit are determined from multiple control equations. New control values are generated and sent simultaneously to adjust several equalization control components. This procedure is reiterated until the error values for each of the frequency components of the calibration signal are within desired limits.

BRIEF DESCRIPTION OF THE DRAWINGS

In the detailed description of a preferred embodiment of the invention presented below, reference is made to the accompanying drawings in which like elements are numbered with like numbers.

DETAILED DESCRIPTION OF THE PREFERRED EMBODIMENT

The following description of a preferred embodiment of the present invention will be made with reference to the automatic calibration of the record/reproduce channel of a magnetic tape recorder. It will be understood, however, that the calibration technique of the present invention may be used in other apparatus, in which a data channel must be calibrated or adjusted due to changes in the characteristics of the channel. In the application explained below, the calibration technique of the present invention will be described with respect to a record/reproduce channel of a magnetic tape recorder.

Figure 1:
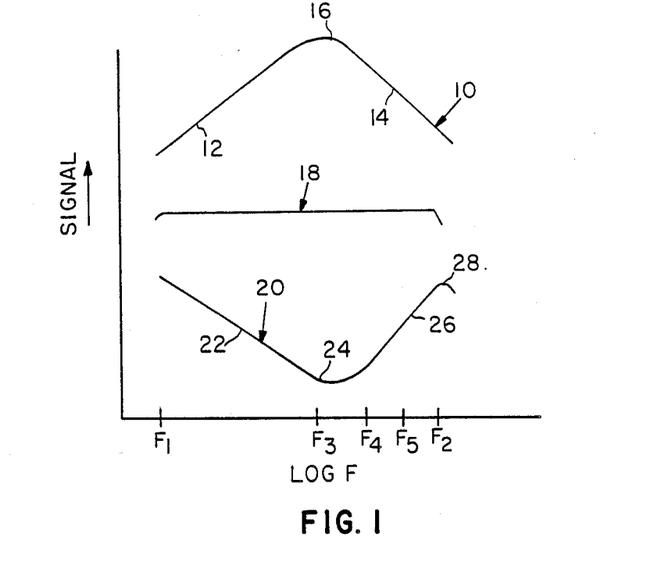
FIG. 1 is a signal amplitude verses log frequency diagram illustrating the signal response of a record/reproduce channel of a magnetic tape recorder.

Referring to FIG. 1, curve 10 depicts the amplitude versus the frequency response of a reproduce/playback channel of a magnetic tape recorder. Curve 10 includes a segment 12 which extends from the low frequency bandedge to the mid frequency range. The segment is typically ascending at a rate of 6 decibels (db) per octave due to increasing flux change in the reproducing head as recorded information of increasing frequency passes the head gap. The response curve 10 has an upper frequency segment 14 which declines from a peak 16 to a relatively low value in the high frequency range. The declining nature of segment 14 is mainly due to increased head losses with increasing frequency.

The nonlinear response of the reproduce amplifier of a data channel of a magnetic tape recorder is undesirable since it severely distorts the recovered data signal. A desired linear system response is depicted by curve 18 in FIG. 1. In a recording and reproduce channel having a response depicted by curve 18, practically every frequency component of the recorded and reproduced signal has the same amplitude upon reproduction as upon recording, assuming proper phase equalization. Such a linear response curve 18 can be effected by a reproduce amplifier which has a frequency response which is complementary to curve 10. Such a response is shown as curve 20. Curve 20 has a segment 22 which is complementary to segment 12 of curve 10 and has a slope which decreases at a rate of 6 db per octave. Curve 20 has a minimum amplitude region 24 which corresponds to the maximum amplitude region 16 of curve 10. Curve 20 further has an increasing segment 26 which is complementary to the decreasing segment 14 of the curve 10. Segment 26 extends from the mid frequency band region to the high frequency band and peaks at the upper frequency band edge at region 28.

In a magnetic tape recorder which is operable at multiple speeds and which has multiple channels, calibration of the reproduce equalization amplifier for each speed and each channel to effect a linear phase and frequency response for the channel can be time consuming and require skill by the operator. According to the calibration technique of the present invention, a multiple speed, multiple channel magnetic tape recorder may be calibrated in a cost efficient and effective manner and in an optimal period of time.

Figure 2:
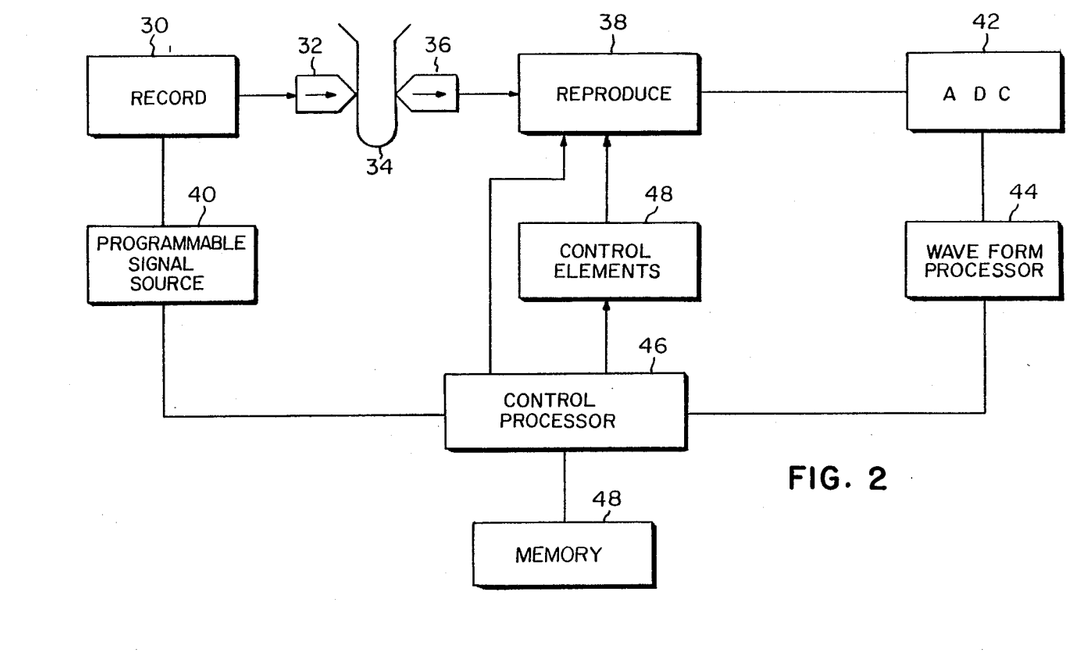
FIG. 2 is a block schematic diagram of apparatus incorporating an embodiment of the present invention.

Referring now FIG. 2, there is shown apparatus which incorporates an embodiment of the present invention. As shown, a record/reproduce channel of a magnetic tape recorder includes a record circuit 30, record head 32, magnetic tape 34, reproduce head 36 and a reproduce amplifier circuit 38. In a broad band magnetic tape recorder, the record/reproduce channel has upper and lower frequency band edges such as frequency $F_1$ and $F_4$ of the response curve shown in FIG. 1.

Reproduce amplifier circuit 38 will be described in greater detail later but, in general, has a frequency response characteristic depicted by curve 20 of FIG. 1. A signal reproduced from magnetic tape 34 by head 36 and having a frequency response characteristic (as depicted by curve 10 in FIG. 1), is equalized by circuit 38 to produce an output signal having a linear frequency and phase response (as depicted by curve 18 of FIG. 1). Reproduce circuit 38 has several circuit control elements which may be adjusted in order to change the shape of curve 20 to calibrate the channel. Moreover, in a multispeed magnetic tape recorder, reproduce circuit 38 is provided with speed switchable circuits to compensate for the change in the frequency characteristic 10 of the reproduced signal as a function of the change in tape speed.

In general according to the automatic calibration technique of the present invention, the record/reproduce channel to be calibrated is stimulated with a complex waveform having harmonic content at frequencies where the adjustable control elements of reproduce circuit 38 are effective. The channel response to this stimulation is measured and the reproduced waveform analyzed into the harmonic frequencies of interest. Thereafter, a set of error values are determined by taking the difference between the measured response at each frequency and a predetermined target response at each of the calibration frequencies. Thereafter, the set of error values are compared to allowable error limits. If the set of error values are within acceptable limits, then the calibration routine is terminated for that channel. If the set of error values are not within acceptable error limits, a new set of control values are determined from multiple control equations. Thereafter, a control processor circuit generates and sends a new set of simultaneous control values to the adjustable components of the reproduce amplifier circuit. The procedure is reiterated until the set of error values are within allowable limits. The automatic calibration technique is repeated for each tape speed for a given channel and then repeated for the set of different tape speeds for each of the other channels.

Figure 3:
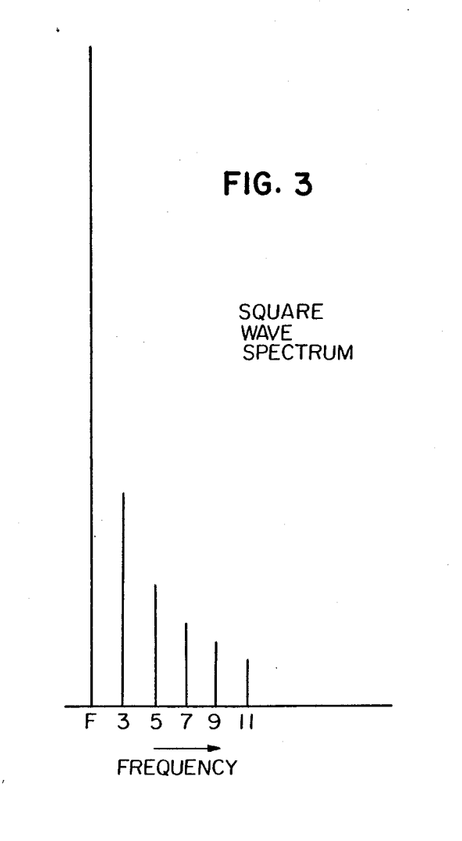
FIGS. 3 and 4 are waveform diagrams of calibration signals which may be used to stimulate the circuit of FIG. 2.

The automatic calibration technique described above is implemented in the record/reproduce apparatus of FIG. 2 as follows. Programmable signal source 40 supplies a calibration signal having complex waveform with harmonic content at specific calibration frequencies. One such signal is the square wave as shown in FIG. 3 to have a frequency spectrum which includes a fundamental f and odd harmonics which progressively decrease in amplitude as the harmonics increase.

Figure 4:
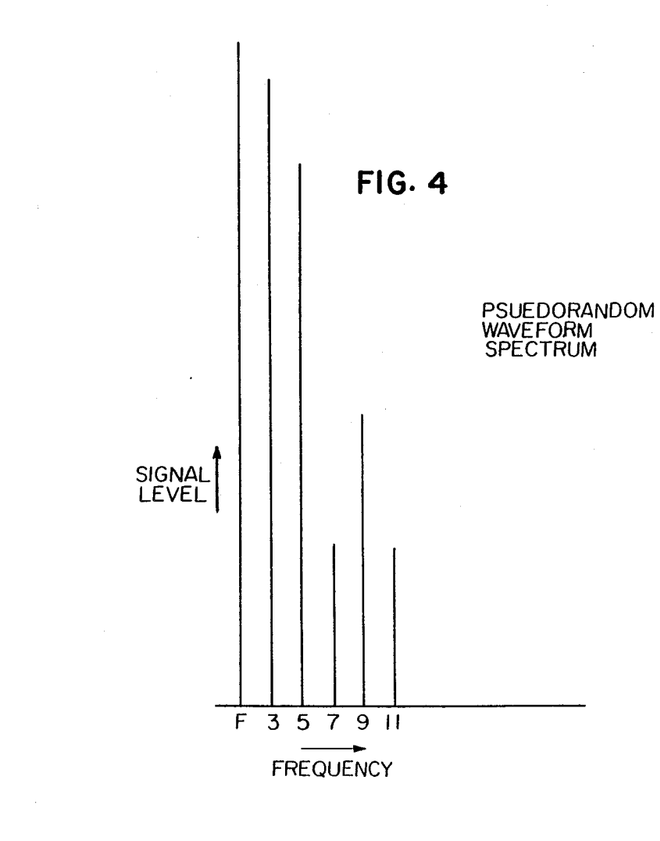

Another complex waveform which has been found to be more effective, is the psuedorandom waveform, the frequency spectrum of which is shown in FIG. 4. As shown, the higher frequency harmonics, i.e. the 7th, 9th and 11th harmonics, have greater amplitudes than the higher frequency harmonics of the square wave of FIG. 3. Thus, when the psuedorandom signal is passed through the record/reproduce channel, the higher frequency harmonics have a higher signal to noise ration and are easier to measure. Thus, calibration of the reproduce equalization amplifier at the higher frequencies will be more accurate.

The waveform supplied by source 40 is recorded on tape 34 by means of head 32; is reproduced from tape 34 by means of reproduce head 36; and is amplified and equalized by reproduce circuit 38. A fast analog to digital converter (ADC) 42 converts the signal from amplifier 38 into a digital signal which is supplied to waveform processor 44 (such as a fast fourier transform processor). Processor 44 analyzes the digital signal for its harmonic content and produces a digital signal having the same frequencies as the original calibration signal. However, the record/reproduce channel may introduce errors into the signal which are corrected according the calibration technique of present invention.

Control processor 46 (which may for example be a microprocessor or other digital control processor) compares the magnitudes of the set of measured frequency components with the magnitudes of a set of required or expected values. The set of required response values are stored in memory 48 as a lookup table. Memory 48 may, for example, be a read only memory (ROM) or a removable memory, such as a cartridge or other removable media. The difference between the expected values and the measured values result in a set of error values The set of error equations are as follows:

$$e_f = (f)_r - (f)_s$$

$$e_3 = (3)_r - (3)_s$$

$$e_5 = (5)_r - (5)_s$$

$$e_7 = (7)_r - (7)_s$$

$$e_9 = (9)_r - (9)_s$$

$$e_{11} = (11)_r - (11)_s$$

wherein the set of required response values are $(f)_r$ = magnitude of fundamental component of complex waveform $(3)_r$ = magnitude of 3rd harmonic component of complex waveform $(5)_r$ = magnitude of 5th harmonic component of complex waveform $(7)_r$ = magnitude of 7th harmonic component of complex waveform $(9)_r$ = magnitude of 9th harmonic component of complex waveform $(11)_r$ = magnitude of 11th harmonic component of complex waveform and the set of measured values are $(f)_s$ = magnitude of fundamental component of complex waveform $(3)_s$ = magnitude of 3rd harmonic component of complex waveform $(5)_s$ = magnitude of 5th harmonic component of complex waveform $(7)_s$ = magnitude of 7th harmonic component of complex waveform $(9)_s$ = magnitude of 9th harmonic component of complex waveform $(11)_s$ = magnitude of 11th harmonic component of complex waveform The set of error values are then compared to predetermined error limits to determine whether they are within allowable ranges. If the error values are within the allowable ranges, then the calibration procedure is terminated for that channel. If the error limits are not within the allowable error limit ranges then, according to the technique of the present invention, new control values are calculated and used to adjust frequency sensitive control elements of reproduce equalization circuit 38. As will be described in greater detail later, the control elements of circuit 38 are interactive, so that an adjustment of one control element may have an effect on the other control elements.

Figure 7:
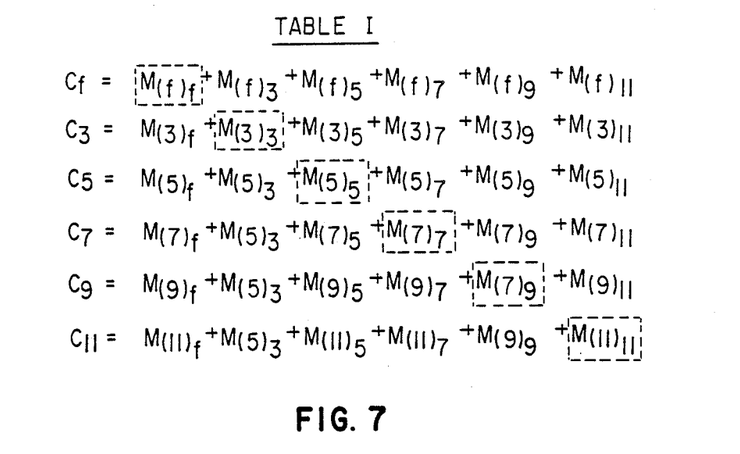
FIG. 7 is a table of a set of equations useful in effecting the calibration technique of the present invention.

The set of general equations shown in Table I of FIG. 7 is used to calculate the control value for each of the first six odd harmonic frequencies of the calibration signal (i.e. fundamental, 3rd, 5th, 7th, 9th, 11th harmonics). The set of equations are used for calculating the control signals $C_f$, $C_3$, $C_5$, $C_7$, $C_9$ and $C_{11}$. Each equation gives the total change of response due to the change of value of each of the control elements.

The main transfer functions (slopes) of change of response to changes of control are as follows:

$$M_{(f)f} = \Delta(f)_s / \Delta C_f$$

$$M_{(3)3} = \Delta(3)_s / \Delta C_3$$

$$M_{(5)5} = \Delta(5)_s / \Delta C_5$$

$$M_{(7)7} = \Delta(7)_s / \Delta C_7$$

$$M_{(9)9} = \Delta(9)_s / \Delta C_9$$

$$M_{(11)11} = \Delta(11)_s / \Delta C_{11}$$

where $\Delta(f,3,5,7,9,11)_s / \Delta C_{f,3,5,7,9,11}$ is the change of the indicated harmonic response to the change of the indicated harmonic control. The partial transfer functions (slopes) of change in response to change of other controls are as follows $$M_{(f)3} = \Delta(f)_s / \Delta C_3$$

$$M_{(f)5} = \Delta(f)_s / \Delta C_5$$

$$M_{(f)7} = \Delta(f)_s / \Delta C_7$$

$$M_{(f)9} = \Delta(f)_s / \Delta C_9$$

$$M_{(f)11} = \Delta(f)_s / \Delta C_{11}$$

$$M_{(3)f} = \Delta(3)_s / \Delta C_f$$

$$M_{(3)5} = \Delta(3)_s / \Delta C_5$$

$$M_{(3)7} = \Delta(3)_s / \Delta C_7$$

$$M_{(3)9} = \Delta(3)_s / \Delta C_9$$

$$M_{(3)11} = \Delta(3)_s / \Delta C_{11}$$

$$M_{(5)f} = \Delta(5)_s / \Delta C_f$$

$$M_{(5)3} = \Delta(5)_s / \Delta C_3$$

$$M_{(5)7} = \Delta(5)_s / \Delta C_7$$

$$M_{(5)9} = \Delta(5)_s / \Delta C_9$$

$$M_{(5)11} = \Delta(5)_s / \Delta C_{11}$$

$$M_{(7)f} = \Delta(7)_s / \Delta C_f$$

$$M_{(7)3} = \Delta(7)_s / \Delta C_3$$

$$M_{(7)5} = \Delta(7)_s / \Delta C_5$$

$$M_{(7)9} = \Delta(7)_s / \Delta C_9$$

$$M_{(7)11} = \Delta(7)_s / \Delta C_{11}$$

$$M_{(9)f} = \Delta(9)_s / \Delta C_f$$

$$M_{(9)3} = \Delta(9)_s / \Delta C_3$$

$$M_{(9)5} = \Delta(9)_s / \Delta C_5$$

$$M_{(9)7} = \Delta(9)_s / \Delta C_7$$

$$M_{(9)11} = \Delta(9)_s / \Delta C_{11}$$

$$M_{(11)f} = \Delta(11)_s / \Delta C_f$$

$$M_{(11)3} = \Delta(11)_s / \Delta C_3$$

$$M_{(11)5} = \Delta_{(11)s}/\Delta_{C5}$$

$$M_{(11)7} = \Delta_{(11)s}/\Delta_{C7}$$

$$M_{(11)9} = \Delta_{(11)s}/\Delta_{C9}$$

where $M_{(f,3,5,7,9,11)f,3,5,7,9,11}$ is the indicated partial transfer function;

$\Delta_{(f,3,5,7,9,11)s}/\Delta_{Cf,3,5,7,9,11}$ is the change of the indicated harmonic response to change of the indicated harmonic sensitive control.

After the control values have been calculated by matrix techniques, the new control values sent to the frequency sensitive components of reproduce amplifier 38 are calculated from the following set of equations.

$$C_{(N)f} = C_{(o)f} + e_f(C_f)$$

$$C_{(N)3} = C_{(o)3} + e_3(C_3)$$

$$C_{(N)5} = C_{(o)5} + e_5(C_5)$$

$$C_{(N)7} = C_{(o)7} + e_7(C_7)$$

$$C_{(N)9} = C_{(o)9} + e_9(C_9)$$

$$C_{(N)11} = C_{(o)11} + e_{11}(C_{11})$$

where $C_{(N)f} - C_{(N)11}$ are the new control values $C_{(o)f} - C_{(N)11}$ are the old control values and $e_f(C_f) - e_{11}(C_{11})$ are the correction values required.

The fast closure method disclosed in commonly assigned, copending U.S. patent, application Ser. No. 252,842, entitled "Fast Closure Method for A Data Signal Channel", Inventor R. D. Andersen, may be used to rapidly reduce the magnitude of the error values upon each iteration. Thus, fewer iterations are required for each channel to effect calibration of the channel.

It has been found that the response of only certain frequency components of a signal processed by the record/reproduce channel need be adjusted in order to provide optimum amplitude equalization of a reproduced signal. These frequency components are at the break points of the equalization curve and are located at 0.1 bandedge (frequency $f_3$ in FIG. 1), 0.6 bandedge (frequency $f_4$) and bandedge (frequency $f_2$). These frequencies are respectively, the break point at the lower end of segment 22 of curve 20, and the lower and upper break points of segment 26 of equalization curve 20 of FIG. 1. According to a feature of the present invention, the calibration signal which is used to stimulate the record/reproduce channel of FIG. 2, has a fundamental frequency which equals the 1/11 bandedge frequency. Consequently, the 7th harmonic of this signal is approximately equal to the 0.6 bandedge frequency ($f_4$) and the 11th harmonic is approximately equal to the bandedge frequency ($f_2$). Thus, only control values for the fundamental, 7th and 11th harmonics need be calculated. Thus, to effect proper calibration of the reproduce/equalization circuit 38 of FIG. 2, only the error and control values for these frequencies need be calibrated.

Since the harmonic components of the calibration signal measured by waveform processor 44 include both amplitude and phase information, a second set of equations similar to the above equations are used to calculate phase error and control signal which is used to control phase equalization in reproduce circuit 38. The phase control value is determined from the 9th or 11th harmonic values. This control value is sent to reproduce circuit 38 at the same time that the three amplitude control values are sent.

Figure 5:
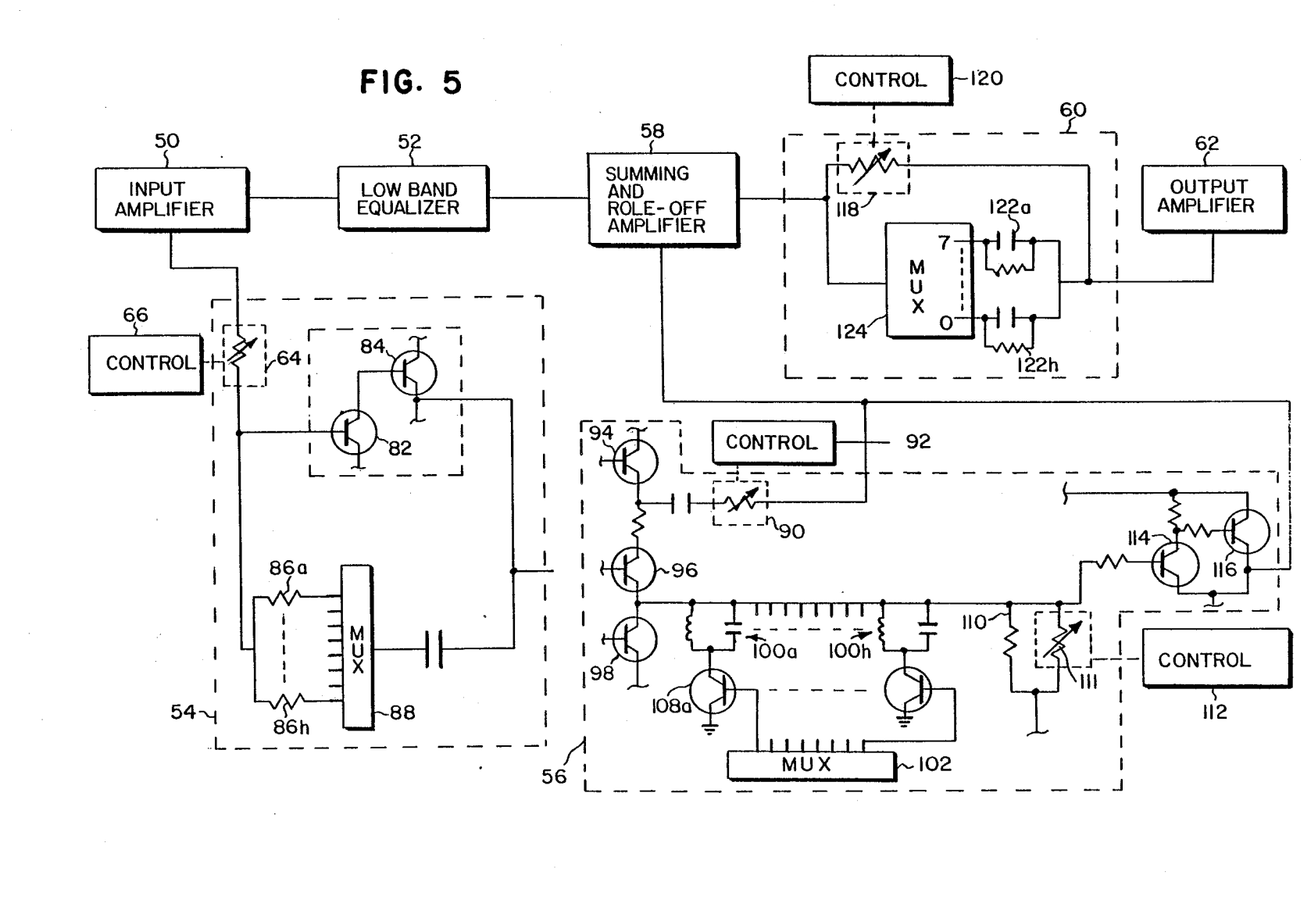
FIG. 5 is a block, schematic diagram of a reproduce equalization amplifier circuit of FIG. 2.

Referring now to FIG. 5, there will be described in greater detail a preferred embodiment of reproduce amplifier circuit according to the present invention. As shown, circuit 38 includes input preamplifier 50, low-band equalizer circuit 52, high-band gain circuit 54, high-band equalizer circuit 56, summing and roll-off amplifier circuit 58, phase compensation circuit 60 and output amplifier circuit 62. Input preamplifier circuit 50 amplifies the low level signal which is reproduced by reproduce head 36 from magnetic tape 34. Low-band equalizer circuit 52 equalizes the low frequency band of the reproduce signal (for example, segment 22 of curve 20 of FIG. 1). Circuits 50 and 52 may be any well known preamplifier and low-band equalization circuits well known to those skilled in the art.

High-band gain circuit 54 and high-band equalizer circuit 56 are shown in greater detail since they include three frequency sensitive adjustable control elements which are controlled according to the calibration technique of the present invention described above. The outputs of circuits 52 and 56 are summed in summing amplifier circuit 58 and the high frequency response rolled off at a frequency which is a function of the tape speed. The output of circuit 58 is phase equalized in circuit 60 which includes the 4th controllable element according to the calibration technique of the present invention. The output signal from phase compensation circuit 60 is amplified by output amplifier circuit 62.

Figure 6:
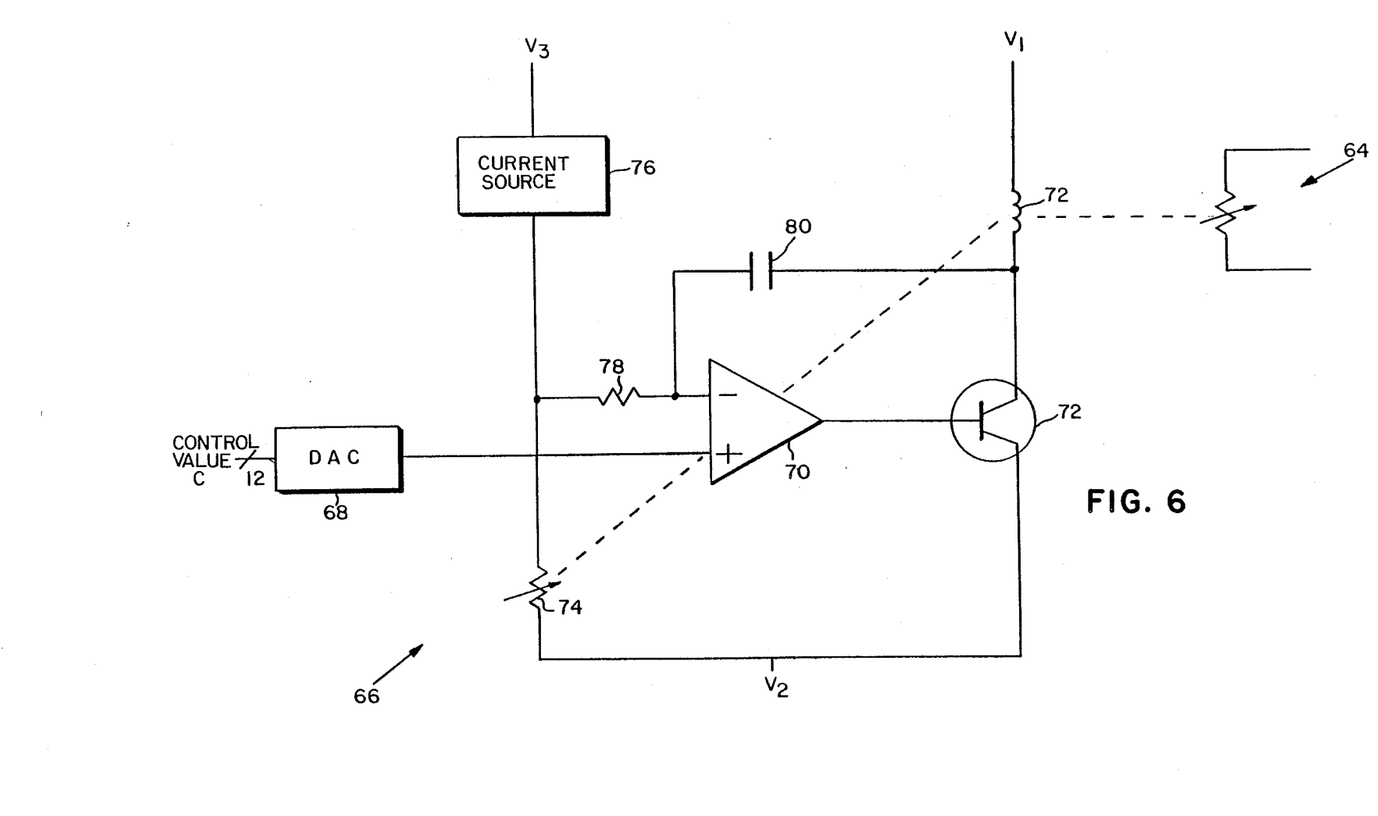
FIG. 6 is a schematic diagram of a controlled resistor circuit of FIG. 2.

High-band gain circuit 54 controls the high-band, lower end break point at frequency $f_4$ (FIG. 1). Circuit 54 includes adjustable resistor 64 which, according to an aspect of the present invention, comprises a radiation sensitive resistor, the resistance of which is controlled by resistor control circuit 66. Resistor 64 and circuit 66 are described in greater detail in copending, commonly assigned U.S. patent application Ser. No. 245,473 entitled VOLTAGE CONTROLLED RESISTOR, Inventor R. D. Andersen, filed Sept. 16, 1988. Reference is made to FIG. 6 wherein control circuit 66 includes a digital-to-analog converter 68 which converts a digital signal to an analog signal. In the example given, control processor 46 provides digital control signal C for the 0.6 bandedge frequency adjustment. Signal C comprises a 12 bit digital signal. The analog voltage output of converter 68 is applied to the noninverting input of operational amplifier 70. A radiation source 72 is connected to the output of the amplifier 70 by means of transistor 72. Connected to the inverting input of amplifier 70 is a feedback radiation sensitive resistor 74 which is optically coupled to radiation source 72. Controlled radiation sensitive resistor 64 is also optically coupled to radiation source 72. Radiation sensitive resistors 74 and 64 preferably have substantially identical resistance ranges. A current source 76 is also connected to the noninverting input of amplifier 70. A compensation circuit including resistor 78 and capacitor 80, is connected between the input and output of amplifier 70 to precisely control the resistance value of resistor 64.

In operation, a digital control signal C applied from controlled processor 46 to digital-to-analog converter 68 is converted to an analog voltage signal which is applied to operational amplifier 70. Operational amplifier 70 causes radiation source 72 to change its radiation output and thereby change the resistance value of radiation sensitive resistors 74 and 64 with which it is optically coupled. The compensation circuit (including resistor 78 and capacitor 80) controls the values of resistors 64 and 74 to a precise value.

Referring once again to FIG. 5, control resistor 64 is connected to an amplification circuit including transistors 82 and 84 and associated circuitry.

Since the high-band gain is dependent upon the tape speed used, circuit 54 also includes a plurality of resistors 86A-86H which are selectively switched by means of programmable multiplexer 88. Resistors 86A-86H respectively establish the high-band gain frequency for the selected speed, while controlled resistor 64 permits fine tuning of the frequency during calibration.

High-band equalizer circuit 56 includes a mid-band gain adjustment resistor 90. Resistor 90 is also preferably a controlled radiation sensitive resistor which is controlled by resistor-control circuit 92. Resistor 90 and control circuit 92 are identical to resistor 64 and control circuit 66. (See FIG. 6) Circuit 56 includes amplifier transistors 94, 96 and 98 and associated circuitry. Circuit 56 also includes a plurality of peaking circuits 100A-100H which are selectively switched by programmable multiplexer 102. Each peaking circuit 100 includes an inductor 104 and capacitor 106 connected in parallel and a switching transistor 108. Only one of the peaking circuits 100 is selected as a function of the tape speed.

Circuit 56 also includes a controlled radiation sensitive resistor 110 in parallel with a fixed resistor 112. Control resistor 110 is controlled by control circuit (See FIG. 6). Control resistor 110 is parallel to each of the inductor/capacitor combinations and along with the selected combination establishes the peaking gain at bandedge for the selected tape speed. Controlled resistor 110 permits calibration of the frequency as described above.

The output from circuits 52 and 56 are summed in amplifier circuit 58.

Phase compensation circuit 60 includes a radiation controlled resistor 118 controlled by control circuit 120 (See FIG. 6). Control resistor 118 is serially connected to a selected one of a parallel resistor/capacitor circuit 122A-122H. The particular circuit 122 is selected by means of programmable multiplexer 124.

The output of circuit 60 is provided to output amplifier 62 which amplifies the phase and amplitude equalized signal.

The invention has been described in detail with particular reference to a particular embodiment thereof but it will be understood that variations and modifications can be effected within the spirit and scope of the invention.

What is claimed is:

1. A method of automatically calibrating a data channel having a plurality of adjustable control elements which are sensitive to respective different frequencies of a signal transmitted over the channel, the method comprising the steps of setting the adjustable control elements of said data channel at predetermined values;

stimulating the data channel to be calibrated with a complex waveform having harmonic content at the frequencies at which such adjustable control elements are effective;

measuring the channel response to said stimulation and analyzing the waveform to produce a set of measured response values at the desired frequencies of interest;

determining a set of error values constituting an error value between said measured response value and a target response value at each of said frequencies;

comparing the set of error values to allowable error limits, and if the set of error values are within allowable limits terminating the calibration procedure;

but, if the set of error values are not within allowable limits, simultaneously determining a new set of control values for the adjustable control elements from multiple control equations;

generating and simultaneously applying said set of new control values to the adjustable control elements to reset said elements; and repeating each of the above steps, except the first step, until said error values are within the allowable predetermined limits for each of the desired frequency components.

2. The method of claim 1 wherein the waveform used in stimulating said data channel is a square wave.

3. The method of claim 1 wherein the waveform used in stimulating said data channel is a psuedorandom waveform having large amplitude higher frequency harmonics.

4. The method of claim 1 wherein said measuring and analyzing step is effected by converting the analog channel response signal to a digital signal and by analyzing said converted digital signal into a set of harmonic values by means of fast fourier analysis.

* * * * *